United States Patent
Cheng

(10) Patent No.: US 6,319,089 B1
(45) Date of Patent: Nov. 20, 2001

(54) SOUND GENERATOR FOR A CHILD'S CYCLE

(76) Inventor: Wen-Tai Cheng, No. 27, Sheng-Li 1st st., Jen-Te Hsiang, Tainan Hsien (TW)

(*) Notice: Subject to any disclaimer, the term of this patent is extended or adjusted under 35 U.S.C. 154(b) by 0 days.

(21) Appl. No.: 09/478,098

(22) Filed: Jan. 5, 2000

(51) Int. Cl.[7] .................................................. A63H 17/34
(52) U.S. Cl. ............................................ 446/409; 446/440
(58) Field of Search .................................. 496/397, 404, 496/409, 411, 414, 430, 440, 425

(56) References Cited

U.S. PATENT DOCUMENTS

| | | | |
|---|---|---|---|
| 3,076,650 | * | 2/1963 | Richter .............................. 446/409 X |
| 4,597,744 | * | 7/1986 | Rehkemper et al. ............. 446/440 X |
| 5,154,658 | * | 10/1992 | Marcus .............................. 446/409 X |
| 5,334,078 | * | 8/1994 | Hippely et al. ................... 446/465 X |

* cited by examiner

*Primary Examiner*—D. Neal Muir
(74) *Attorney, Agent, or Firm*—William E. Pelton, Esq.

(57) ABSTRACT

A sound generator used in a cycle having a main body for a child to ride is disclosed. The sound generator includes a lever, a device for defining an original position of the lever relative to the main body and urging the lever to return to the original position after being swung away therefrom, and a sounder adapted to be actuated by the lever. The lever has a first end and a second end, and is formed with a pad at the first end for the child to recline thereagainst and is pivotally connected to the main body of the cycle at the second end.

5 Claims, 7 Drawing Sheets

SOUND GENERATOR FOR A CHILD'S CYCLE

BACKGROUND OF THE INVENTION

1. Field of the Invention

The present invention relates to a sound generator and, more particularly, to a sound generator used in a cycle for a child.

2. Description of Related Art

There exists a cycle having a sound generator that sounds when a child sitting on the cycle reclines against a seatback thereof. With reference to FIG. 7, such a seatback (80) typically has a foam portion (82) housing therein a bellow (81) with a whistle fitted to an opening thereof. When the child rests against the seatback (80) the bellow (81) is compressed causing air to flow out therefrom via the whistle and thus generating an amusing sound. When the child moves away from the seatback (80), the process is reversed.

Although the sound generator is amusing, it has the following disadvantages:

1. not very positive in actuation:

Because the bellow (81) is disposed in the seatback (80) at a certain portion, it is unlikely that children of different heights will recline on the seatback (80) exactly at this portion.

2. discomfort:

Because the seatback (80) is not homogeneous, it is not comfortable for the child reclining thereagainst.

Therefore, it is an objective of the invention to provide an improved sound generator for the cycle to mitigate and/or obviate the aforementioned problems.

SUMMARY OF THE INVENTION

The object of the present invention is to provide a sound generator for a cycle which is positive in actuating a sounder involved therein.

Another object of the present invention is to provide a sound generator which is extremely comfortable for a child to recline thereagainst.

Other objects, advantages and novel features of the invention will become more apparent from the following detailed description when taken in conjunction with the accompanying drawings.

DETAILED DESCRIPTION OF THE PREFERRED EMBODIMENT

Figure 1:
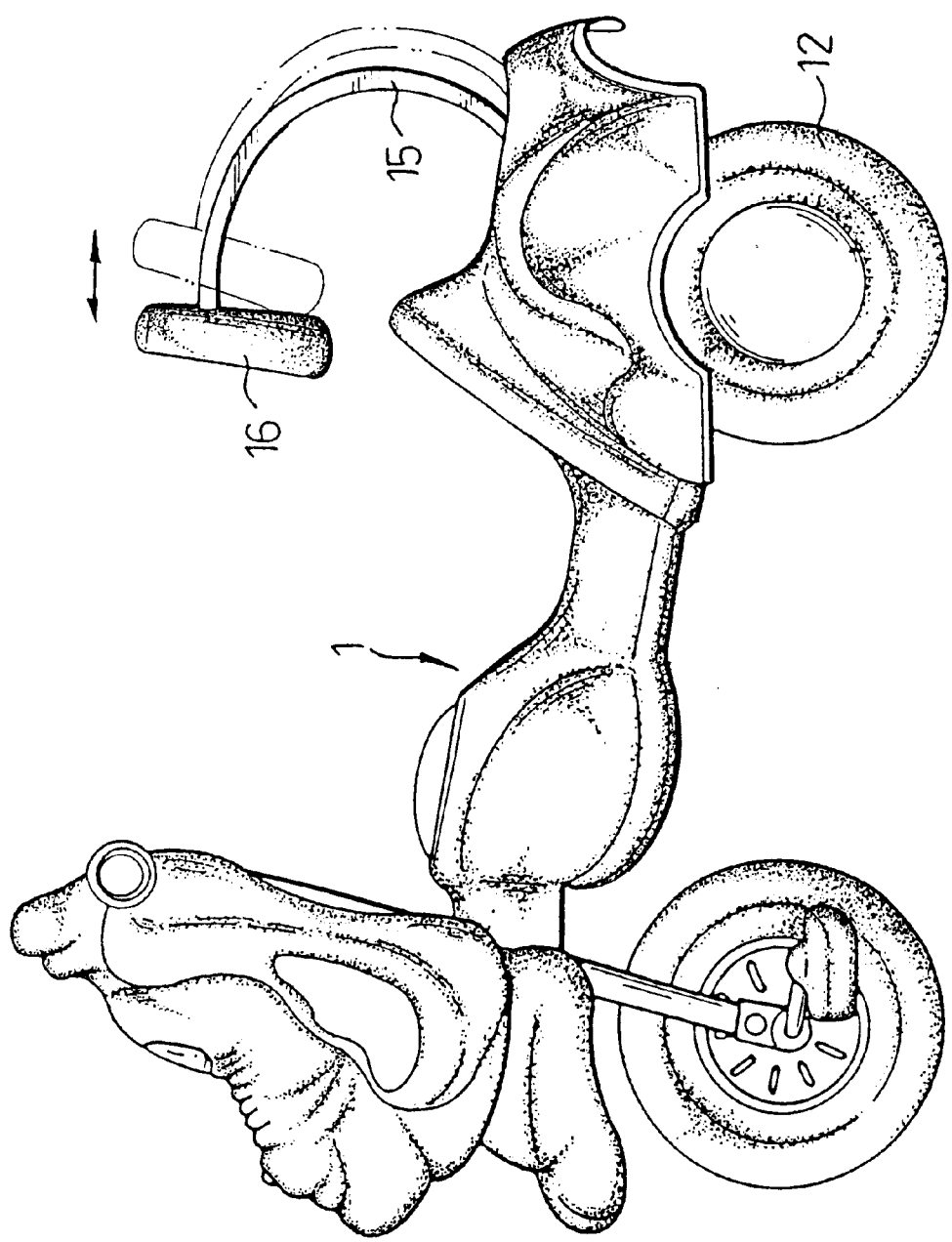
FIG. 1 is a side view of a cycle provided with a sound generator in accordance with the present invention.

Referring to FIG. 1, a cycle is provided with a preferred embodiment of a sound generator constructed in accordance with the present invention.

The cycle typically has a main body (1) with wheels (12) rotatably connected thereto. The inventive sound generator includes an arcuate lever (15), with a first end thereof formed as a soft pad (16). The lever (15) is pivotal relative to the main body (1) in such a way that a sound will be generated when a child riding the cycle on the main body (1) reclines against the pad (16).

The cycle may be a bicycle or a tricycle, although the tricycle is described as an embodiment below.

Figure 2:
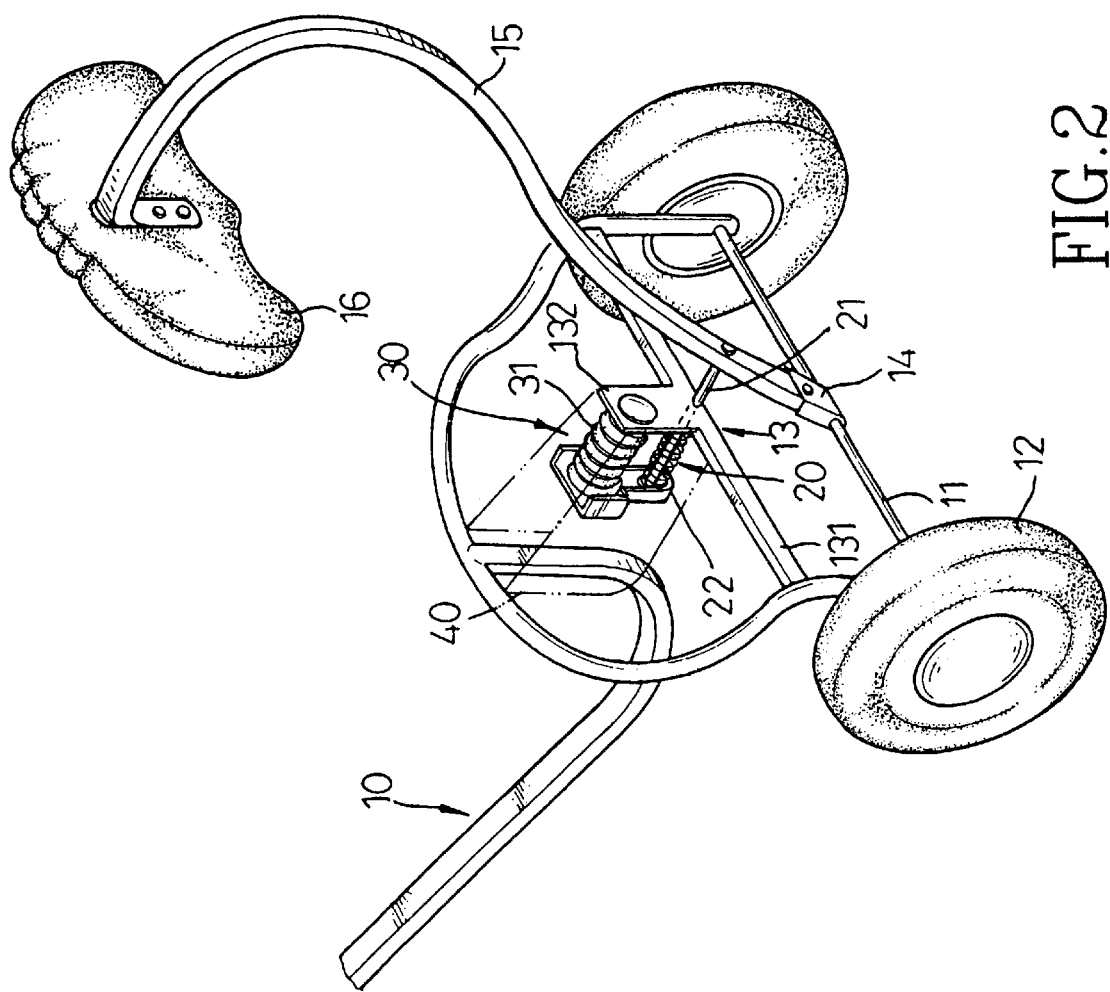
FIG. 2 is a perspective view showing the sound generator in detail.
Figure 3:
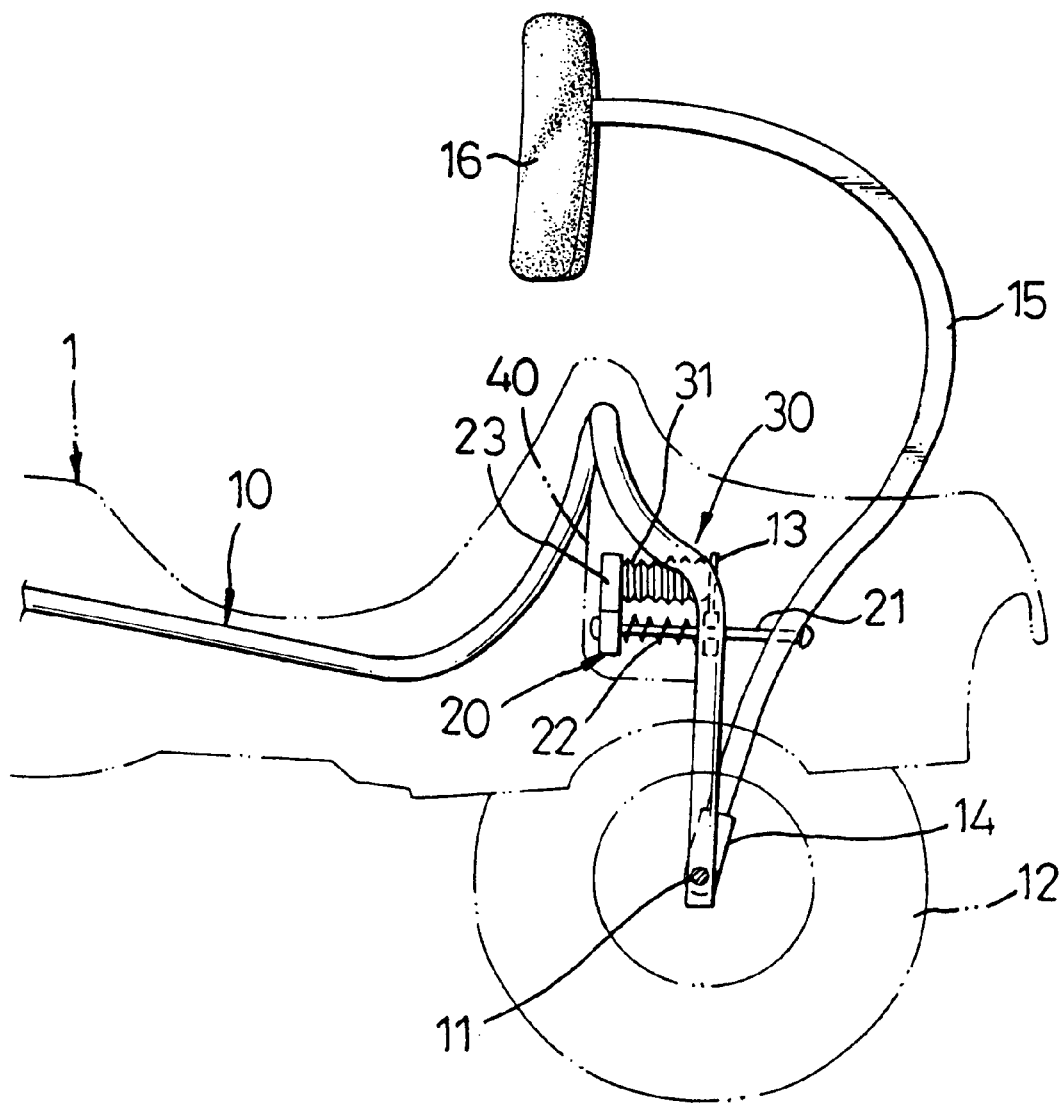
FIG. 3 is a side view of the sound generator of FIG. 2.

Referring to FIGS. 2 and 3, the main body (1) has a frame (10) extending to an axle (11) to which a back pair of the wheels (12) is connected. The lever (15) is pivotally connected at a second end thereof to the main body (1), such as to the axle (11) by way of a joint (14), so as to be pivotal relative to the body (1) about the axle (11).

Figure 5:
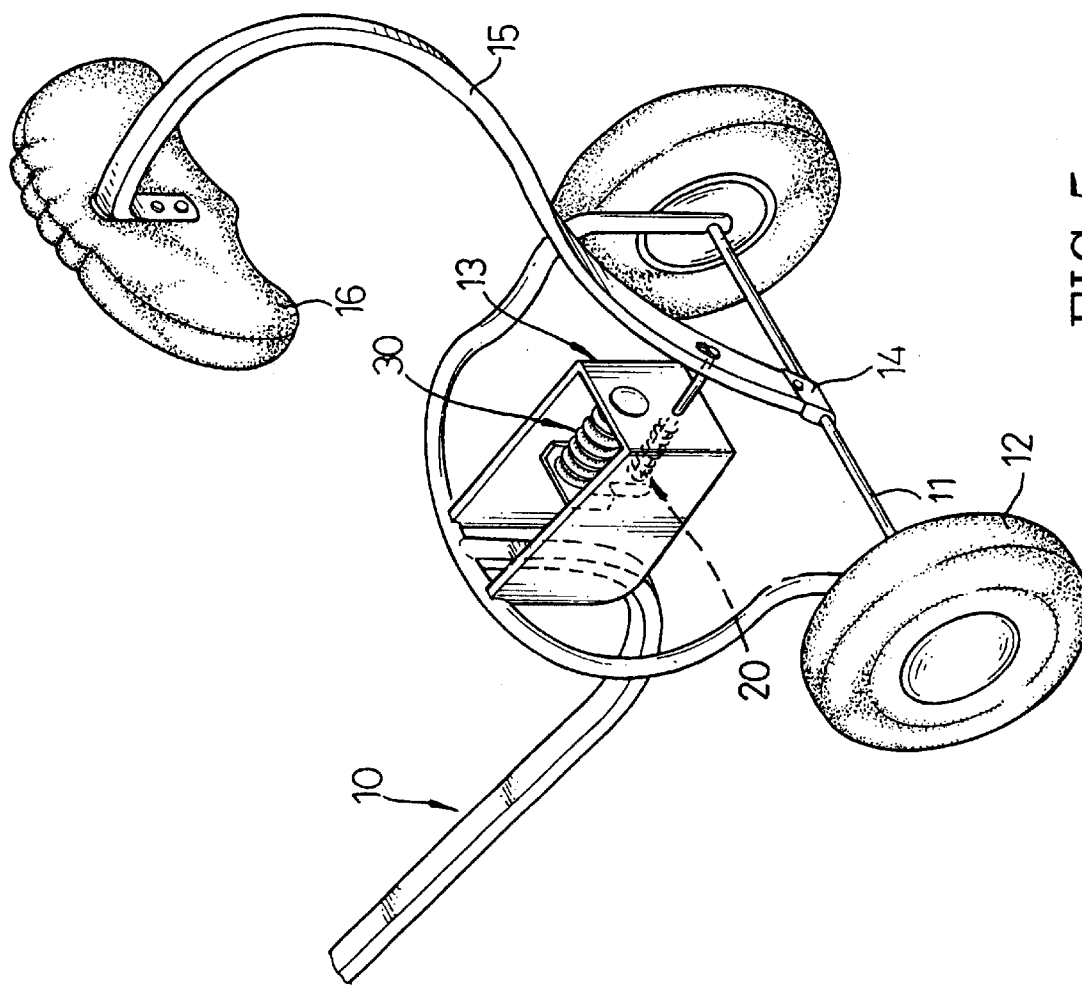
FIG. 5 is a perspective view of an alternative embodiment of a holder of the sound generator of the present invention.

The main body (1) further has a holder (13) fixed to the frame (10) for a purpose as will be described hereinafter. The holder (13) may be configured as a crosspiece (131) formed with a tab (132) upwardly extending therefrom, as shown in FIG. 2, or alternatively as an enclosure, as shown in FIG. 5.

Irrespective of the configuration thereof, the holder (13) is used to support means (20) for defining an original position of the lever (15) relative to the main body (1) and urging the lever (15) to return to the original position after being swung away therefrom, and a sounder (30) adapted to be actuated by the lever (15).

Still referring to FIGS. 2 and 3, the means (20) for defining and urging includes a rod (21) having a first end formed with an operating piece (23) and a second end extending through the holder (13) and attached to the lever (15) in a location between ends thereof, and a spring (22) mounted around the rod (21) and disposed between the operating piece (23) and the holder (13).

The spring (22) will be compressed by the operating piece (23) when the lever (15) is pivoted backward with respect to the main body (1). The lever (15) will return to its original position under the action of the compressed spring (22), once the pad (16) is unloaded.

Figure 6:
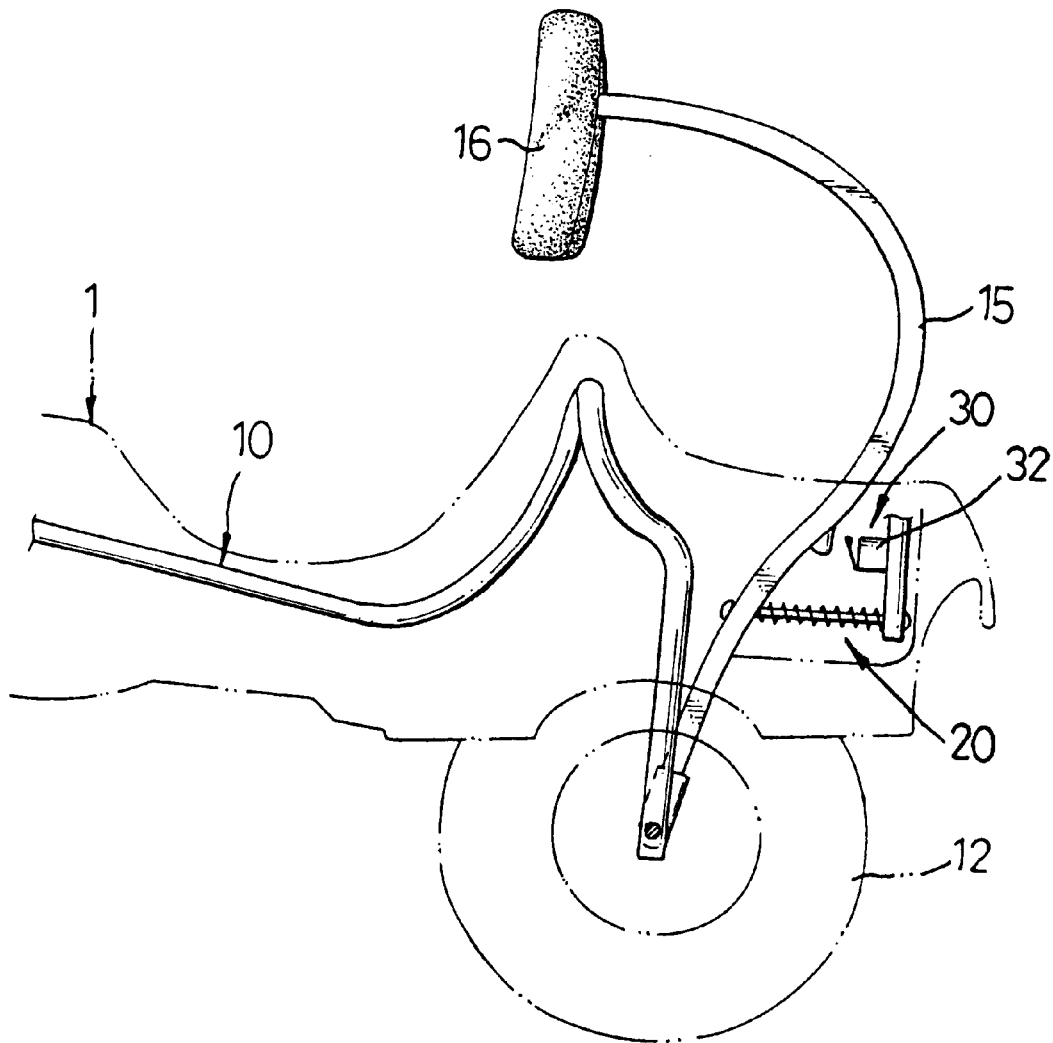
FIG. 6 is side view of an alternative embodiment of an electric beeper of the sound generator of the the present invention.
Figure 7:
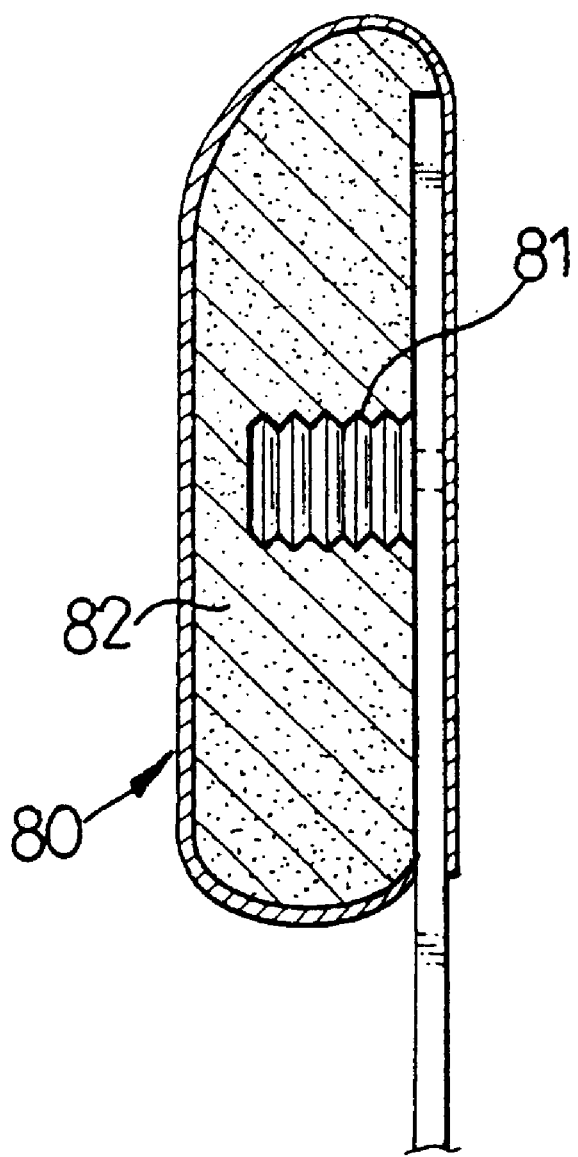
FIG. 7 is a side view of a conventional sounder generator having a sounder disposed in a seatback.

As shown in FIG. 3, the sounder (30) may be a whistle (31) arranged between the operating piece (23) and the holder (13) to generate an amusing sound in response to the backward movement of the operating piece (23) when the lever (15) is pivoted backward, or may be, as shown in FIG. 6, an electric beeper (32) adapted to be actuated by the lever (15). It is preferable that the sounder (30) is shielded by a housing (40) to eliminate the risk of dangerous insertion of the child's hand(s).

Figure 4:
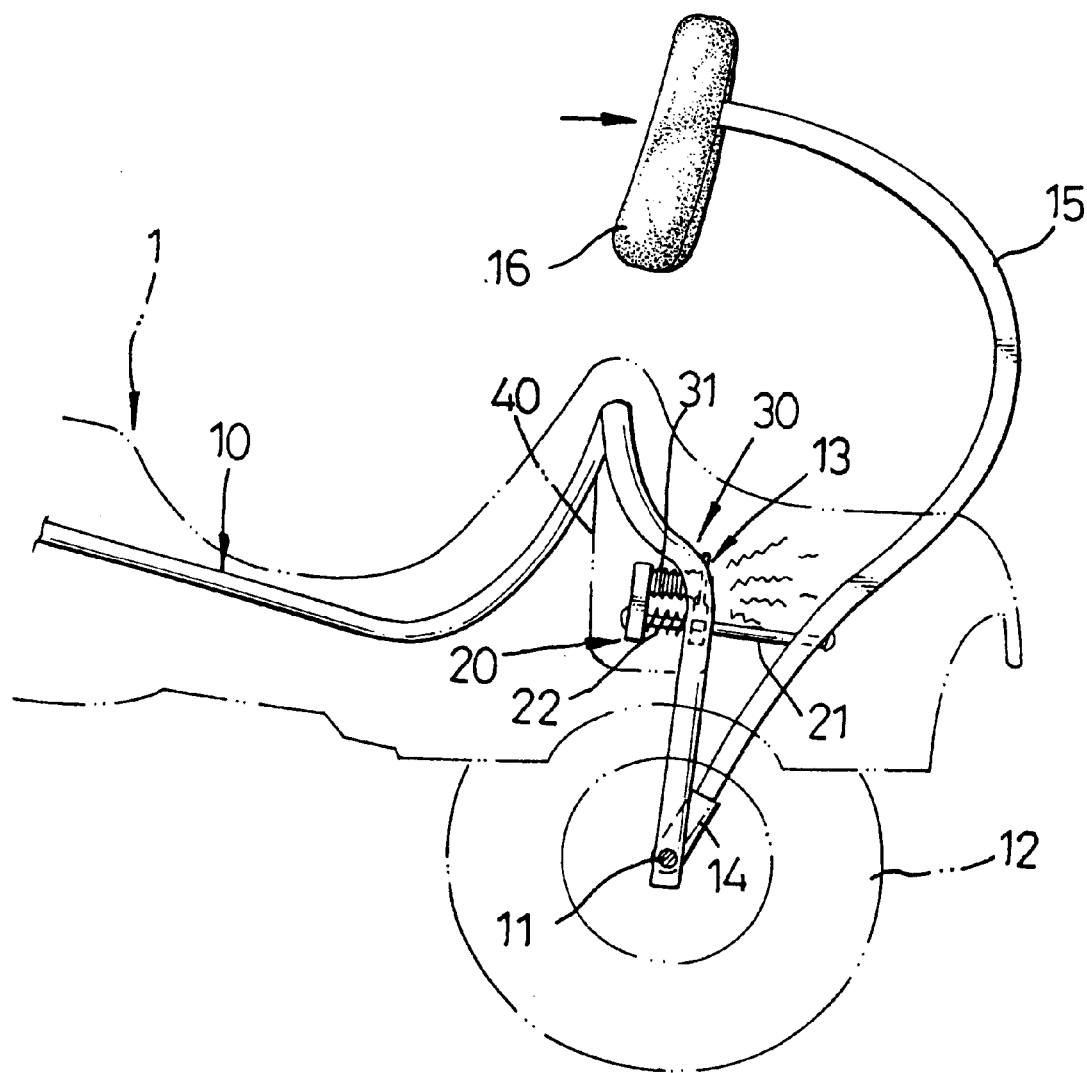
FIG. 4 is a side view of the sound generator of FIG. 2 in operation.

Referring to FIG. 4, the lever (15) is pivoted backward relative to the main body (1) of the tricycle, as long as the child riding the tricycle reclines on the pad (16). As a result, repeated and regulated amusing sounds will be generated in synchronism with the sway of the body of the child.

From the above description, it is noted that the invention has the following advantages:

1. positive actuation:

Because the sounder (30) is actuated with the backward movement of the pad (16), the sounds are generated once the child reclines against any portion of the pad (16).

2. extreme comfort:

Because the soft pad (16) is homogeneous in the soft content therein, the child feels comfortable when contacting the pad (16).

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A sound generator used in a cycle having a main body (1) for a child to ride, comprising:
    a lever (15) having a first end and a second end, said lever (15) being formed with a pad (16) at said first end for said child to recline thereagainst and being pivotally connected to said min body (1) of said cycle at said second end;
    means (20) for defining an original position of said lever (15) relative to said main body (1) and urging said lever (15) to return to said original position after being swung away therefrom; and
    a sounder (30) adapted to be actuated by said lever (15).

2. The sound generator as claimed in claim 1, wherein said main body (1) has a holder (13) for supporting said means (20) for defining and urging.

3. The sound generator as claimed in claim 2, wherein said means (20) for defining and urging includes a rod (21) having a first end formed with an operating piece (23) and a second end extending through said holder (13) and attached to said lever (15) in a location between said ends of said lever (15), and a spring (22) mounted around said rod (21) and disposed between said operating piece (23) and said holder (13).

4. The sound generator as claimed in claim 1, wherein said sounder (30) is embodied as a bellow-operated whistle (31).

5. The sound generator as claimed in claim 1, wherein said sounder (30) is embodied as an electric beeper (32).

* * * * *